United States Patent [19]
Szwaykowski et al.

[11] Patent Number: 5,973,784
[45] Date of Patent: Oct. 26, 1999

[54] COMMON PATH, INTERFEROMETRIC SYSTEMS AND METHODS USING A BIREFRINGENT MATERIAL FOR TOPOGRAPHIC IMAGING

[75] Inventors: Piotr Szwaykowski, Tucson, Ariz.; Michael Greenebaum, Brooklyn; Theodore S. Shultz, Larchmont, both of N.Y.

[73] Assignee: Electro-Optical Sciences, Inc., Irvington-On-Hudson, N.Y.

[21] Appl. No.: 09/004,560

[22] Filed: Jan. 8, 1998

Related U.S. Application Data

[63] Continuation-in-part of application No. 08/786,140, Jan. 21, 1997., abandoned, and application No. 08/780,336, Jan. 8, 1997., abandoned

[51] Int. Cl.[6] .......................................... G01B 9/02
[52] U.S. Cl. .............................. 356/351; 356/360
[58] Field of Search ............................ 356/345, 351, 356/359, 360

[56] References Cited

U.S. PATENT DOCUMENTS

| | | |
|---|---|---|
| 4,236,082 | 11/1980 | Butler . |
| 4,386,827 | 6/1983 | Scifres et al. . |
| 4,714,348 | 12/1987 | MaKosch . |
| 5,434,669 | 7/1995 | Tabata et al. . |
| 5,671,050 | 9/1997 | de Groot . |

OTHER PUBLICATIONS

"Numerical correction of reference phases in phase–shifting interferometry by iterative least–squares fitting", G. Han et al., Applied Optics, vol. 31, Nov. 1, 1994; pp. 7321–7325.

"Phase–Measurement Interferometry Techniques", K. Creath, Progress in Optics XXVI, 1988; pp. 351–391.

"New compensating four–phase algorithm for phase–shift interferometry", J. Schwider et al., Optical Engineering, vol. 32, No. 8, Aug. 1993; pp. 1883–1885.

"Automatic moire contouring", H. Cline et al., Applied Optics, vol. 23, No. 10, May 15, 1984; pp. 1454–1459.

"Optical Shop Testing", D. Malacara, John Wiley & Sons, 1978; pp. 283–317.

"Polarization based fringe projection interferometer for phase stepping techniques", P. Szwaykowski, SPIE, vol. 2783, May 1996; pp. 250–257.

*Primary Examiner*—Robert Kim
*Attorney, Agent, or Firm*—Watov & Kipnes, P.C.

[57] ABSTRACT

Common path, two beam interferometers and interferometric measurement systems employ a voltage controlled variable phase retarder enabling rapid stepping of the relative phase between two interfering optical beams by suitable control of the voltage. The beams need not be laterally separated. A compact beam expander with a ball lens is preferably included. The system is compact enough to be contained in a hand-held unit. The system can be used for surface mapping, testing of optical components and detecting the motion of mechanical objects, for example. It is particularly well suited for the mapping of the skin of a live subject. An optimum fringe period and optimum illumination wavelengths for imaging skin are disclosed, enabling the topography of substantial areas of human skin to be rapidly and accurately measured, in times on the order of one-tenth of a second. Methods of conducting interferometric analysis are disclosed, as well.

29 Claims, 11 Drawing Sheets

(PRIOR ART)

COMMON PATH, INTERFEROMETRIC SYSTEMS AND METHODS USING A BIREFRINGENT MATERIAL FOR TOPOGRAPHIC IMAGING

This application is a continuation-in-part of U.S. Ser. No. 08/786,140, filed on Jan. 21, 1997, and U.S. Ser. No. 08/780,336, filed on Jan. 8, 1997, now both abandoned which are both assigned to the assignee of the present invention and incorporated by reference herein.

FIELD OF THE INVENTION

This invention relates to interferometers and interferometric analyzing systems and, in particular, to systems including common path, two beam interferometers. Such systems can be used in the measurement of surface topography, for example. The system is particularly suited for measuring skin topography.

BACKGROUND OF THE INVENTION

Two beam interferometers split a light beam into two light beams, which are typically directed over different paths and then recombined so that the light beams interfere with each other. The interfering beams produce an interference pattern which may be projected onto a surface. A phase stepping technique may be used to vary the phase difference between the interfering light beams, facilitating measurement of characteristics of the surface based on the interference pattern at the various phase steps. Varying elevations over a region of a surface, small movements of the surface and the characteristics of optical devices such as a lens can be analyzed by such a technique.

Figure 1:
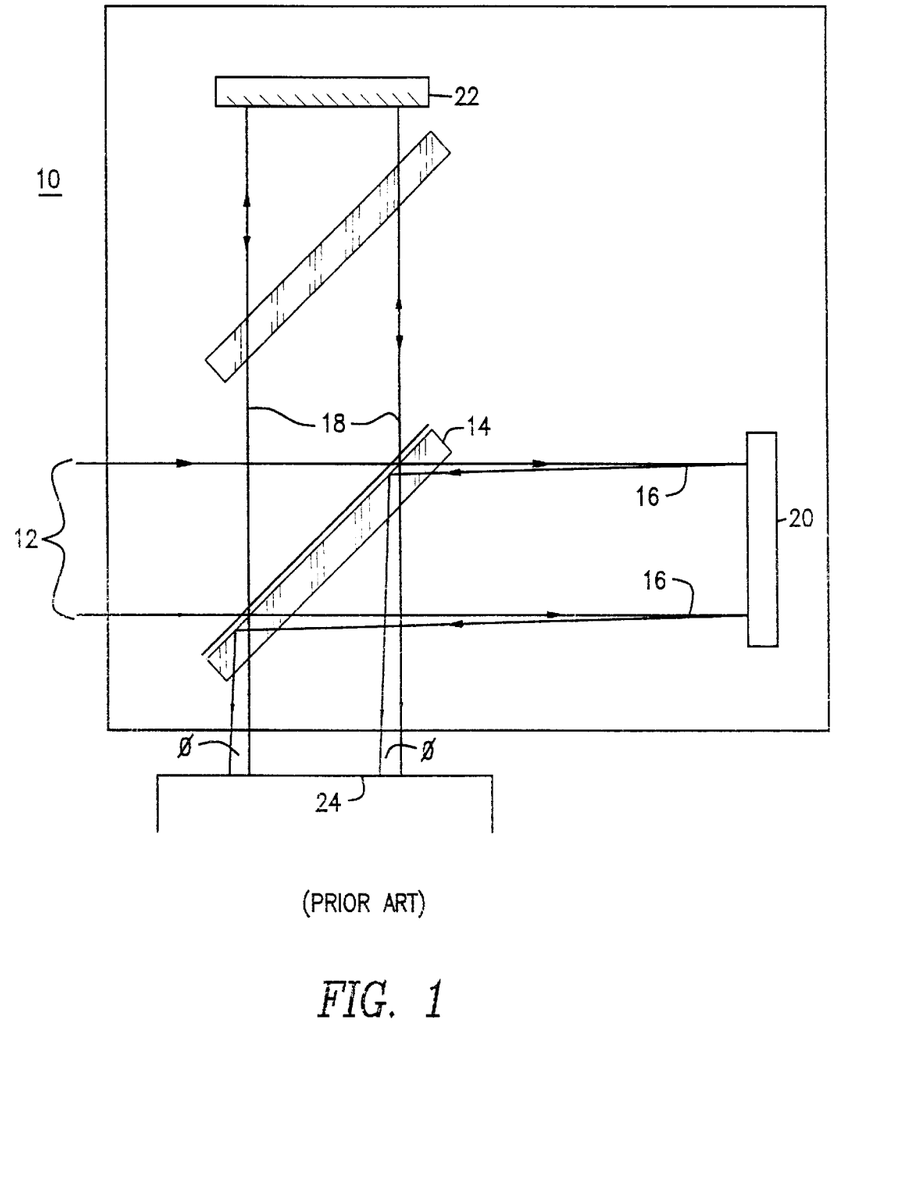
FIG. 1 is a schematic diagram of a prior art Michelson interferometer employing mechanical control of the phase shift.

FIG. 1 illustrates a prior art Michelson interferometer 10 that is often used to provide the phase stepping needed for typical applications. A beam of spatially and temporally coherent light 12 is projected on a beam splitter 14, which divides the light into two beams 16 and 18. The light beams 16, 18 are projected onto mirrors 20 and 22, respectively. The mirrors 20 and 22 reflect the light beams 16 and 18, respectively, back to the beam splitter 14, which recombines the beams and directs the recombined beam toward the fringe observation plane 24. The fringe spacing "d" in the observation plane 24 is determined by $d=\lambda/2\sin\phi$, where $\phi$ is the angle between the beams 16, 18 and $\lambda$ is the light wavelength. As the difference in the phase between the two interfering beams 16, 18 is varied, the fringes move across the field of view.

The relative phase between the light beams is changed by a mechanical device which translates one of the mirrors, such as mirror 22, along the direction of light propagation in small steps (a fraction of a wavelength). At least three images are obtained, wherein the maxima of the projected interference fringe in each image occurs at a different lateral position. The steps in lateral fringe position correspond with the steps in the relative phase between the two interfering beams. The visibility of the fringes as the mirror is displaced depends upon the degree of longitudinal coherence of the source. Because the sensitivity of such an interferometer needs to be very high, the element controlling the phase shift must have high mechanical precision. The successful construction of such a device, therefore, demands great skill.

Because the two beams 16, 18 traverse different paths, they may be subject to different environmental effects, such as vibration, temperature differences and noise, which can cause deviations in the resulting interference pattern. Such deviations can introduce significant errors into the analysis of surface heights and the motion of precision tooling, microscopes and lithographic equipment, for example, as well as in the analysis of optical systems.

In addition, the mapping of surface elevation by profilometers of the prior art, including interferometric varieties, is often a slow process. While mapping of the surface of skin is useful for dermatological, cosmetic and pharmaceutical applications, a living subject cannot be restrained from movement long enough to successfully map the surface height over a meaningful area. Optically opaque silicone rubber casts are therefore taken of the skin surfaces and the casts are separately analyzed for surface height. When taken of curved surfaces such as skin, however, such casts often do not maintain the shape of the curved surface and do not faithfully replicate the height variations of skin.

U.S. Pat. No. 5,434,669 to Tabata et al. ("Tabata") shows an interferometric device for use in endoscopy, including embodiments where electrooptic and liquid crystals are used to cause a phase shift between polarized components of a light beam. (See FIGS. 21, 22). While providing some improvement over mechanical phase shifting devices, the light is conveyed between the optical components of the system and onto the area of interest through optical fibers, which can alter the phase retardation produced by the electrooptic or liquid crystals in an uncontrollable manner, due to thermally and mechanically induced instabilities in the transmission of the light. In addition, the optical fibers are said to be "polarization-maintaining". While such fibers have been found to maintain the state of the polarization of the light, i.e., linear polarization, they do not necessarily maintain the direction of polarization. The use of optical fibers limits the size of the surface which can be accurately analyzed, as well. Tabata's devices are therefore inappropriate for topographic imaging of skin over large fields of view at high resolution, in times sufficiently short to prevent blur due to motion of the subject.

SUMMARY OF THE INVENTION

The present invention includes a common path, two beam interferometer and a measurement system including such an interferometer, wherein rapid phase shifts are caused by a suitably controlled birefringent material. Interferometric methods are also disclosed.

In accordance with the present invention, an interferometer comprises a source of a linearly polarized light beam. A variable phase retarder which retards the phase of the orthogonal components of the linearly polarized light relative to each other is positioned to receive the linearly polarized light beam. The variable phase retarder comprises a birefringent material. A polarization beam splitter ("PBS") is positioned to receive the light beam from the phase retarder. The PBS splits the orthogonal components of the phase retarded light beam into two polarized light beams inclined with respect to each other. A polarizer is positioned to receive the two light beams and project the light beams onto a surface.

The interferometric measurement system of the present invention comprises the interferometer described above, and a detector, which detects light reflected from or scattered by the surface.

In a preferred embodiment, the variable phase retarder is a liquid crystal electrooptic device controlled by a voltage source. A compact beam expander is positioned between the variable phase retarder and the beam splitter. The beam expander may include a single lens, such as a ball lens. A collimator lens system, which is preferably of a telephoto design, collimates the light received from the beam expander. The beam splitter is preferably a Wollaston prism. The detector is a charge-coupled-device ("CCD") imaging camera. A digital computer is coupled to the CCD to analyze the output of the CCD. The digital computer also controls the electrooptic device.

The resulting construction is compact, and compatible in size and form with existing miniature electronic CCD and video cameras. As a result, the interferometric measuring system of this invention is advantageous where a small form factor is needed. The system is particularly well suited for the contactless measurement of surface topography of biological tissues in vivo, such as for determining height variations across the skin of a live subject.

The invention also provides a method for conducting interferometric analysis comprising linearly polarizing a beam of light, birefringently phase retarding the orthogonal components of the linearly polarized light beam relative to each other at least three times in a stepwise fashion, splitting the phase retarded light from each phase retardation step into two interfering light beams inclined with respect to each other, projecting the interfering beams onto a surface, and analyzing the light reflected from and scattered by the surface.

BRIEF DESCRIPTION OF THE DRAWINGS

FIG. 4a is a schematic diagram of a system in accordance with the present invention incorporating the interferometer of FIG. 3, for use in the noncontact measurement of surface topography;

FIG. 4b illustrates a preferred beam expander for use in the system of FIG. 4a;

FIG. 6b is a graph of a timing diagram for application of the voltages of FIG. 6a;

FIG. 7b is a grey-scale representation of the reconstructed elevation variations of the papillary ridges derived in part from the image of FIG. 7a;

DESCRIPTION OF THE INVENTION

Figure 2:
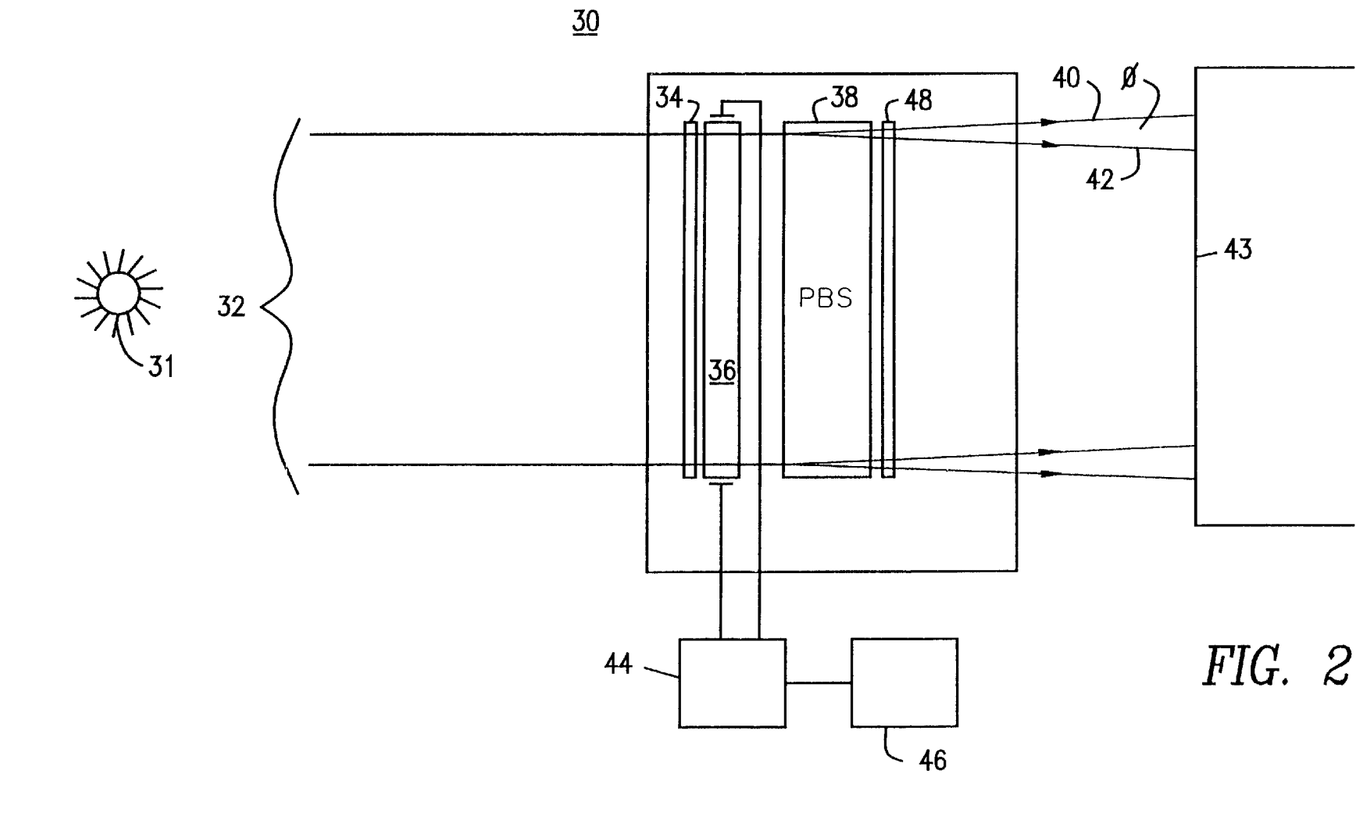
FIG. 2 is a schematic diagram of a common path, two beam interferometer in accordance with the present invention.

FIG. 2 is a schematic diagram of a common path, two beam interferometer 30 of the present invention. The interferometer 30 includes a source of light 31 and a linear polarizer 34 positioned to receive a light beam 32 from the source 31. Linearly polarized light output by the polarizer 34 illuminates a variable phase retarder 36. The variable phase retarder 36 is a birefringent material with a fast and a slow axis, which differentially phase shifts the two orthogonal components of the linearly polarized light beam 32 along each of the axes, respectively. A polarization beam splitter ("PBS") 38 separates these orthogonal components into two light beams 40, 42, which are inclined at a slight angle θ with respect to each other. A linear polarizer (analyzer) 48 is provided downstream of the PBS 38 to allow the passage of light beams 40, 42 having a particular, common direction of polarization so that they form a high contrast interference pattern on a surface 43.

Preferably, the variable phase retarder 36 is an electrooptic device. More preferably, it is a voltage controlled liquid crystal, such as a nematic Liquid Crystal Variable Retarder available from Meadowlark Optics, Longmont, Colo., for example. The voltage controlled electrooptic device provides rapid phase shifts. The switching time between phase steps can be from about 100 milliseconds to about 1 millisecond. The variable phase retarder 36 can also be a mechanically shifted birefringent crystal. Such a crystal can be tilted slightly about a suitable axis relative to its fast or slow axis by a piezoelectric device under voltage control. Such mechanical shifting of the birefringent crystal may enable faster phase shifting than in an electrooptic device, but requires tight mechanical tolerances.

A variable voltage supply 44 is coupled to the variable phase retarder 36 to control the phase retardation. A control device 46, such as a computer or a microprocessor, controls the voltage supply 44. A simpler control device may be used, as well. The phase difference between the orthogonal components of the light beam is controlled by adjusting the voltage. Preferably, the voltages are applied in step functions.

The variable phase retarder 36 is aligned relative to the PBS 38 such that the two orthogonal components of the linearly polarized beam have polarization directions corresponding to the directions of the fast and slow axes of the variable phase retarder 36, respectively.

Since the variable phase retarder 36 operates differentially on the two orthogonal components of the linearly polarized light beam, it is not necessary to physically separate the beams along different paths. The two beams therefore essentially follow a common path, and are subject to the same conditions, minimizing the effects of the environment on the phase difference between the two beams 40, 42.

The light source 31 may be coherent or non-coherent. It may be a laser, a semiconductor laser, a light emitting diode ("LED"), or a laser diode, for example. If the light source 31 emits linearly polarized light, the polarizer 34 is not needed. The light should have high transverse spatial coherence but need not have high temporal coherence.

Figure 3:
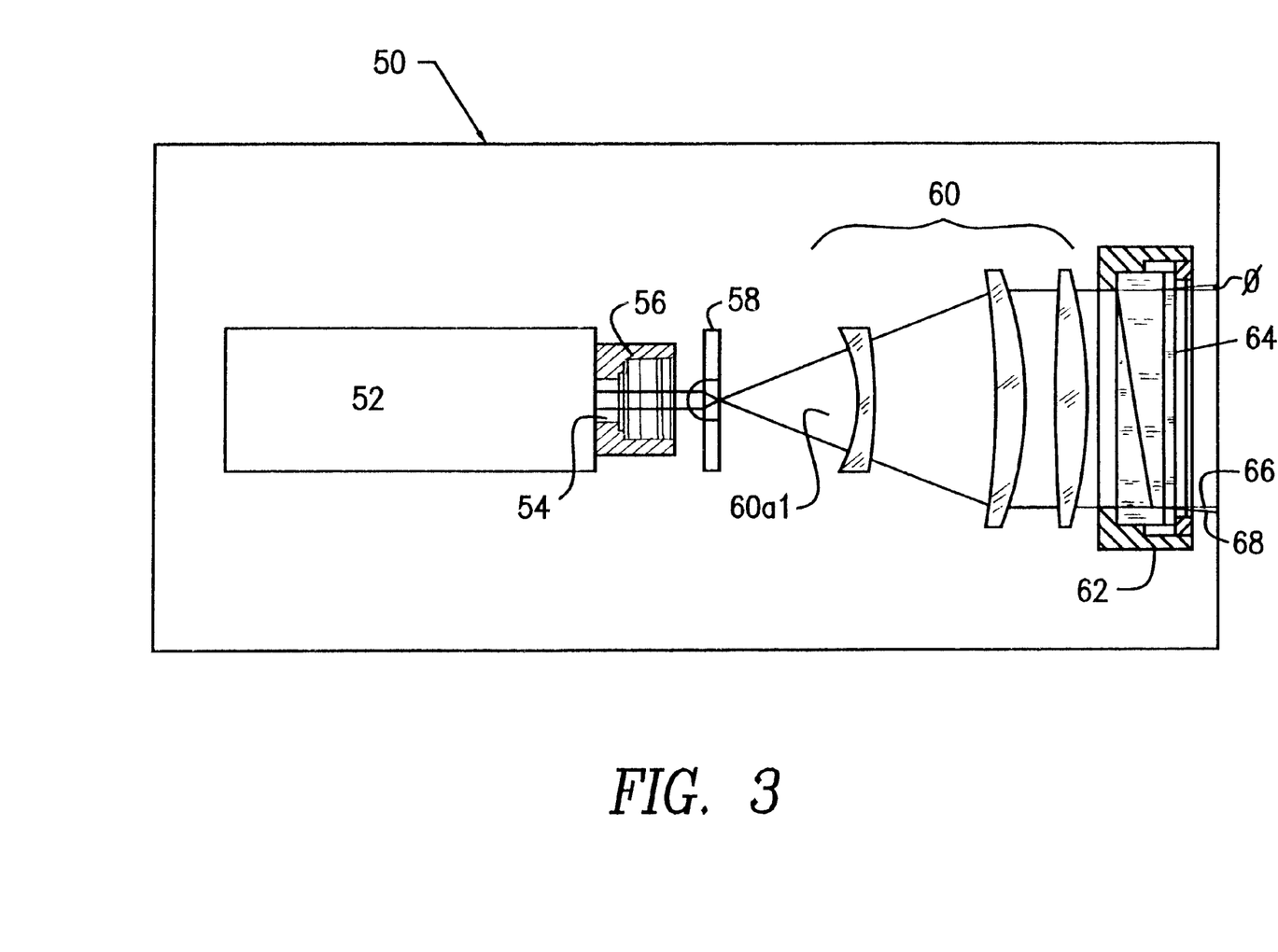
FIG. 3 is a diagram of a preferred common path, two beam interferometer in accordance with the present invention.

FIG. 3 illustrates a preferred configuration of a common path, two beam interferometer 50 in accordance with the present invention. The interferometer 50 includes a laser 52 for providing a light beam to a linear polarizer 54. The preferred liquid crystal variable retarder discussed above is indicated by numeral 56. The preferred PBS is a Wollaston prism 62, which is a compact device resistant to vibration. The slow and fast axes of the variable phase retarder 56 are aligned with the directions of polarization of the two orthogonal components of the linearly polarized light beam that are to be separated by the Wollaston prism 62. The light entering the Wollaston prism 62 is split such that there is an angle θ between the directions of propagation of the two orthogonal components of the linearly polarized light passing through the prism.

A Wollaston prism provides a fixed spacing between fringes. The denser the fringes, the more sensitive the device. The particular spacing which is desirable will depend on the application. A suitable Wollaston prism is available from Karl Lambrecht, Corp., Chicago, Ill., for example.

A beam expander 58 is positioned adjacent to the output of the variable phase retarder 56 to expand the beam to a diameter which is compatible with that of the Wollaston prism 62. A collimating lens system 60 positioned between the beam expander 58 and the Wollaston prism 62 directs a collimated light beam onto the Wollaston prism 62. A linear polarizer 64 corresponding to the polarizer 48 in FIG. 2, is shown as well, adjacent the output side of the Wollaston prism 62. The collimating lens system 60 is provided so that a collimated light beam is projected onto a surface, minimizing the effects of off normal incidence of light onto the area of interest. The beam expander 58 is shown in more detail in FIG. 4b.

The variable phase retarder 42 is preferably positioned in front of the Wollaston prism 62 and the beam expander 58, where the incoming beam from the light source 52 is much narrower than the aperture of the variable phase retarder 56. Such placement helps to minimize degradation of the fringe quality that could be caused by aberrations associated with the variable phase retarder 56. It also enables the use of a smaller variable phase retarder, contributing to the compactness of the interferometer 50.

The voltages applied to the liquid crystal variable phase retarder 56 determine the phase shifts between the interfering beams. The specific voltages to be applied are determined empirically from the measured non-linear characteristic of the variable phase retarder. The variable voltage source 44 and computer 46 are not shown in this view.

Figure 4:
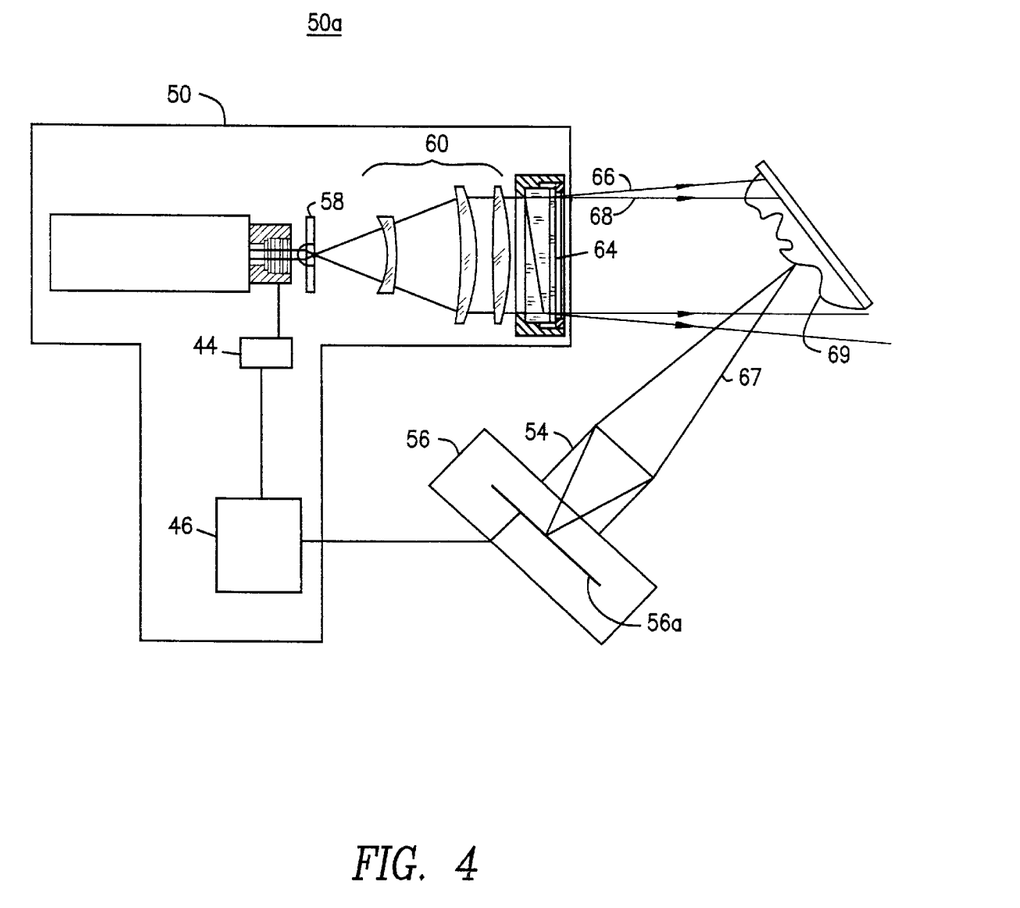

FIG. 4a illustrates a system 50a in accordance with the present invention for use in the noncontact measurement of surface topography to determine the spatial x-y distribution of the height variations of a surface, such as the surface 69. The surface 69 may be the skin of a human subject, for example. The system 50a includes the interferometer 50 of FIG. 3, foreoptics 54 and an electronic charge-coupled-device ("CCD") imaging camera 56. A digital processor 46, such as a computer or microprocessor, is connected to the output of the CCD imaging camera 56 to analyze the electronic images output by the CCD. Preferably, the digital processor 46 also controls the variable voltage supply 44. A computer is preferred.

Figure 4B:
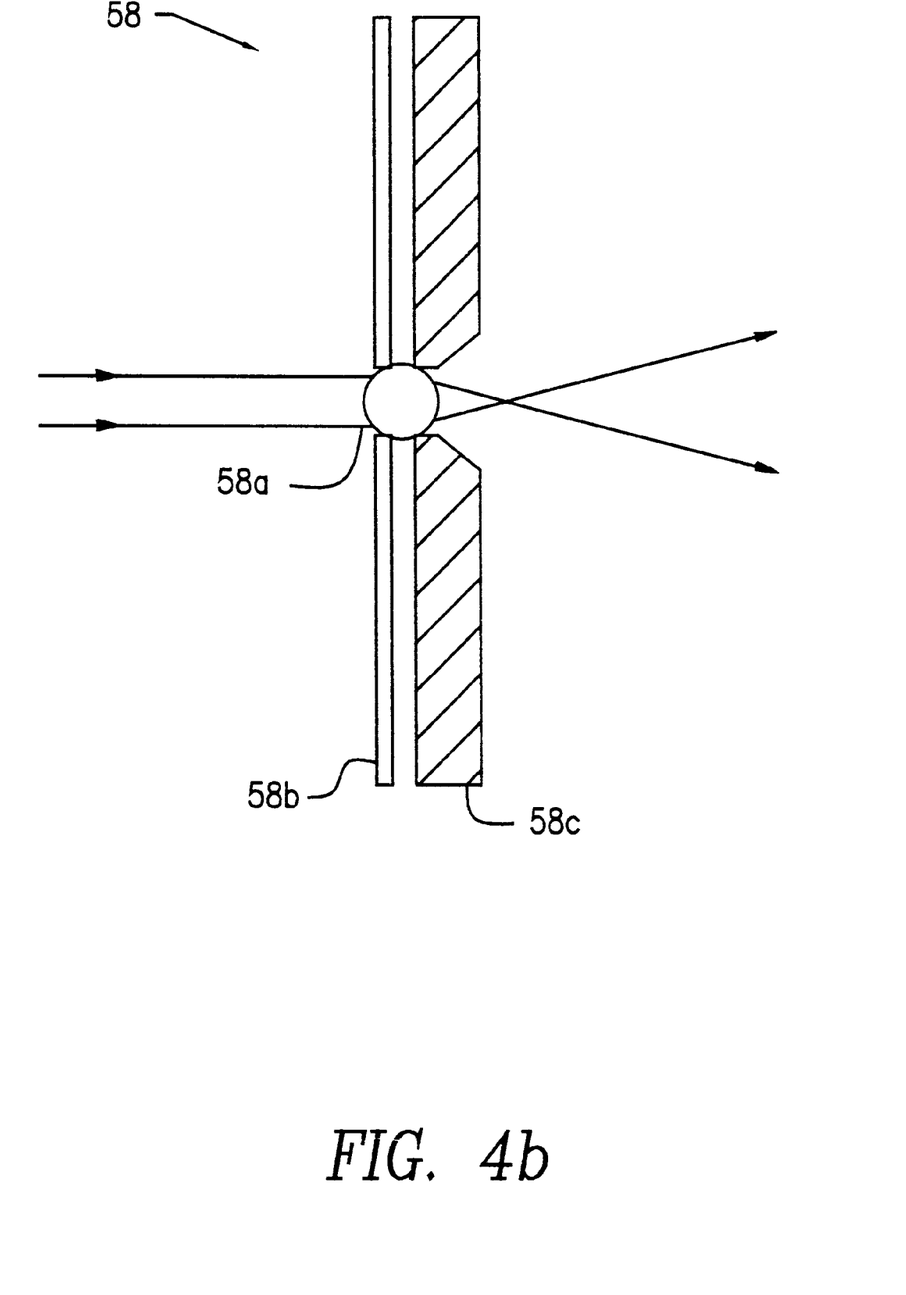

The beam expander 58 is preferably of compact construction, thereby reducing the size and weight of the interferometer 50. The beam expander 58 preferably has a short focal length and a sufficiently large expansion ratio to expand the typically narrow light beam 32 provided by the source 31 to the required size for projection onto a surface. The beam expander 58 may comprise a single lens, such as a ball lens 58a, as shown in FIG. 4b. In this configuration, the ball lens 58a sits partially within holes provided in two supporting plates 58b, 58c. The ball lens 58a preferably has a diameter of about 1–2 mm and may be of any commonly used optical glass, such as borosilicate glass, sapphire or flint glass. BK7 borosilicate polished glass balls are available from Edmund Scientific Co., Barrington, N.J., for example.

The beam expander 58 of the design of FIG. 4b enables the projection of uniform fringes over a large area. It also reduces the intensity of the light to levels that would not be dangerous to the human eye during proper operation of the interferometer 50. While standard beam expanders, which typically comprise multiple lenses, can be used if size and weight are not a consideration, a compact beam expander 58, such as the single lens configuration of FIG. 4b, is compact enough for the interferometer 50 to be used in a hand-held unit, as described with respect to FIG. 5, below.

The collimating lens system 60 preferably has a telephoto design. For example, it may be a triplet including a negative lens 60a, followed by two positive lenses 60b and 60c. The negative lens 60a may have a focal length of −125 mm while the positive lenses 60b, 60c have focal lengths of 200 mm, for example. The effective focal length of this triplet is 135 mm. The physical length of the collimating lens system 60, as measured from the receiving face 60a1 of the negative lens 60a to the focal point of the collimating lens system 60, is less than the effective focal length of the lens system 60. While standard collimating lens systems, where the physical length is greater than or equal to the effective focal length, can be used where size and weight are not a consideration, the preferred collimating lens system 60 also contributes to minimizing the size of the interferometer 50 so that the interferometer 50 can be included in a hand-held unit.

Preferably, the f/numbers of the beam expander 58 and the collimating lens system 60 are not the same. The Gaussian-like intensity profile of the light emitted by the laser 52 is thereby truncated, providing a light beam with a more uniform energy distribution. The desirable degree of truncation depends on the degree of uniformity required in the illumination at the center and the edges of the image plane of the CCD camera 56. While a typical beam expander 58/collimating lens system 60 combination, where the f/numbers are closely matched to conserve light energy may be used, the improved uniformity of the preferred embodiment has been found to be advantageous, particularly in the application of measuring the surface topography of the skin.

Interfering light beams 66, 68 output from the interferometer 50 are projected obliquely onto the surface 69 of an object whose elevation topography is to be measured. An image of the interaction of the interfering light beams with the surface is formed by foreoptics 54, which focuses the light onto the imaging plane 56a of the CCD imaging camera 56. An exemplary light beam 67 is shown coming from the surface 69. The electronic images are sent to the digital processor 46, which calculates the fringe positions for every pixel of the image in any of a variety of known manners. See, for example, Creath, K., "Phase-measurement interferometry techniques," *Progress in Optics,* Vol. 26, pp. 349–383, North Holland, Amsterdam (1988). The fringe positions, in turn, are analyzed to produce the height map, also in a known manner. See, for example, Cline, et al., "Automatic Moire contouring," *Appl. Opt.,* Vol. 23, p. 1454 (1984). A four-step method such as that of Schwider, et al., "New compensating four-phase algorithm for phase-shift interferometry," *Opt. Eng.,* Vol. 32, p. 1883 (1993), may be used. A video camera or other image detector may be used instead of the CCD, but the image would need to be digitized prior to processing. The fringe distortion versus x-y position can be measured with high accuracy in accordance with the method and apparatus of the present invention.

Figure 5:
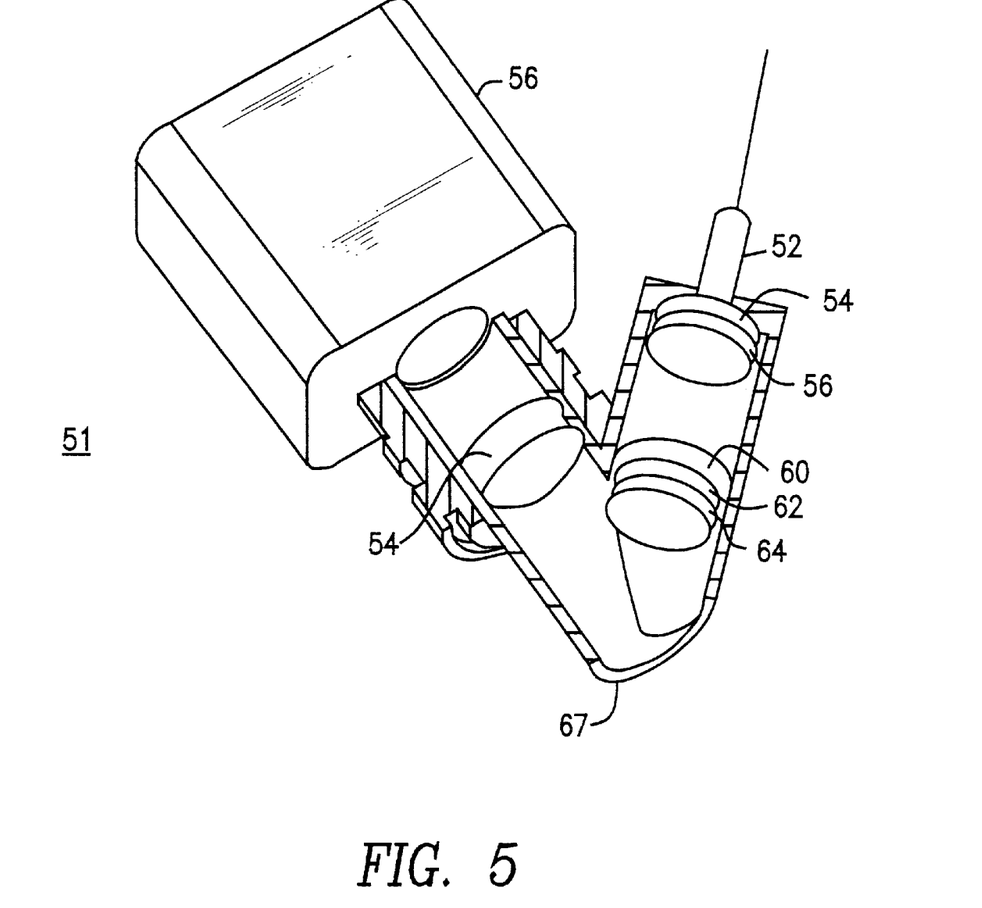
FIG. 5 is a cutaway view of a compact, hand held interferometer analyzing system in accordance with the configuration of FIG. 4a, which is particularly suited for use in mapping the surface topography of the skin of a live subject.

FIG. 5 is a partial cutaway view of a compact, hand held device 51 in accordance with the configuration of FIG. 4a, which is particularly suited for use in mapping the surface topography of the skin of a live subject. Corresponding components of FIG. 4a are similarly numbered in the system of FIG. 5. The device 51 has an output 67, which is positioned on the skin around the area to be mapped.

The light source 52 is a laser which provides a beam with a diameter of 0.06 mm. The liquid crystal variable phase retarder 56 has an aperture diameter of 5 mm. The preferred beam expander 58 of FIG. 4a, not shown in this view, would be positioned between the variable phase retarder 58 and the collimating lenses 60, as discussed above with respect to FIG. 3. The beam expander 58 expands the beam to a diameter of about 31 mm. The collimating lens system 60, Wollaston prism 62 and polarizer 64 have diameters slightly larger than 31 mm, as well. The distance between the first polarizer 54 and the second polarizer 64 is about 95 mm. The angle of inclination θ between the light beams output by the Wollaston prism 62 is about 3.5 microradians. This provides about 1 fringe line per millimeter.

The distance from the surface to the camera 56 is about 120 mm. The camera 56 itself has a length of 75 mm. The sensing array of the CCD of the camera 56 is 8.67 mm×6.59 mm. The output 67 has a diameter of about 30 mm. The device 51 occupies a space of about 6 inches×4 inches. The device weighs about 1 kilogram.

In this embodiment, light is projected directly from one optical component to the next and onto the skin, without the use of optical fibers. The use of optical fibers to convey the light between components and onto the surface to be analyzed is not preferred because thermally and mechanically induced instabilities in the transmission of the light beams tend to change the phase retardation of the light beams. Of course, other optical components such as additional lenses, may be provided.

An appropriate laser is a Neodymium-YAG frequency doubled laser with an output of 528 nanometers and having an output power of about 8 milliwatts, available from Casix, China. This laser 52a is also compact, having a length of about 3–3.5 inches.

Use of the electrooptic variable phase retarder 56, the beam expander 58, the collimating lens system 60, the Wollaston prism 62 and the laser 52 in accordance with this embodiment enables the construction of an extremely compact, portable device 51. Positioning the variable phase retarder 56 prior to the Wollaston prism 62 and the beam expander 58 also enables the use of a smaller variable phase retarder, further contributing to the compactness of the device 51.

When light from a coherent source, such as a laser, is scattered off a rough surface, such as skin, a random intensity distribution of light is generated, giving the surface a granular appearance. Such a light distribution, referred to as "speckles", can compromise the accuracy of measurements. See, for example, J. Briers, "Speckle fluctuations and biomedical optics; implications and applications," *Opt. Eng*, Vol. 32, pp. 277–283, 1993. The speckle pattern caused by the scattering of light by skin has been found to be unstable and to change at a high rate because of internal motion of biological tissue. Blood flow is one cause of such internal motion. Gross movement of the region under view, such as due to movement of the patient, also contributes to the instability and rate of change of the speckle pattern. The high contrast in the speckle pattern needs to be reduced to eliminate the speckle effect from the height measurement of skin.

Several averaging techniques are known for reducing speckle contrast. The preferred method for averaging speckles is to average the light received over an area that is larger than the characteristic size of the speckle, to reduce their contrast to the point that the speckles do not significantly affect the desired accuracy of the topographic mapping. The CCD camera output can be controlled to provide such averaging by a logic chip, for example. The logic chip can be part of the digital processor. In a preferred implementation, the signals from three neighboring pixels of the CCD camera are electronically summed prior to recording the data. The averaging procedure essentially eliminates the speckles in the images obtained from the skin in vivo. This procedure also effectively increases the size of a pixel threefold. Only one-third of the number of pixels therefore need to be transmitted and recorded, reducing the time required for data collection. In addition, the sensitivity (i.e., the signal-to-noise ratio) of the camera at low light levels is enhanced by the electronic summation. While there may also be a reduction in spatial resolution, this has not been found to interfere with skin wrinkle topography measurements. A suitable camera is a 1000 U CCD camera from Electrim, Inc., Princeton, N.J. A suitable logic chip for providing the averaging to avoid speckles is available from Electrim, Inc., as well.

The speckle problem can also be avoided by use of a non-coherent light source, such as an LED.

In addition to causing speckles, multiple scattering of light by skin tissue can degrade the fringe contrast of the resulting image, limiting measurement accuracy. Proper choice of fringe spacing and wavelength have been found to enable adequate measurement of skin height with minimal degradation of contrast and resolution caused by scattering. Considering the detective quantum efficiency of the CCD, and the scattering effects of skin, a wavelength of the light source of between about 450–550 nanometers and a fringe spacing provided by the PBS of between about 0.5–2.0 lines per mm are preferred. With these parameters, skin height elevations of from about 0.05 mm to about 3.00 mm can be accurately resolved.

The desirable angle of impingement of light on the surface depends on two factors, shadowing and sensitivity. Shadowing is decreased as the angle of light impingement on the surface with respect to the normal is decreased. Sensitivity, however, increases as the angle of impingement increases. The actual angle used in a particular application requires a balancing of these factors. For use in skin topography, the angle of projection of the light beams onto the skin by the device 51 is preferably about 30° with respect to normal. This angle has been found to minimize shadowing caused by the elevations and depressions of the skin 69, while providing sufficient sensitivity for this application.

Figure 6A:
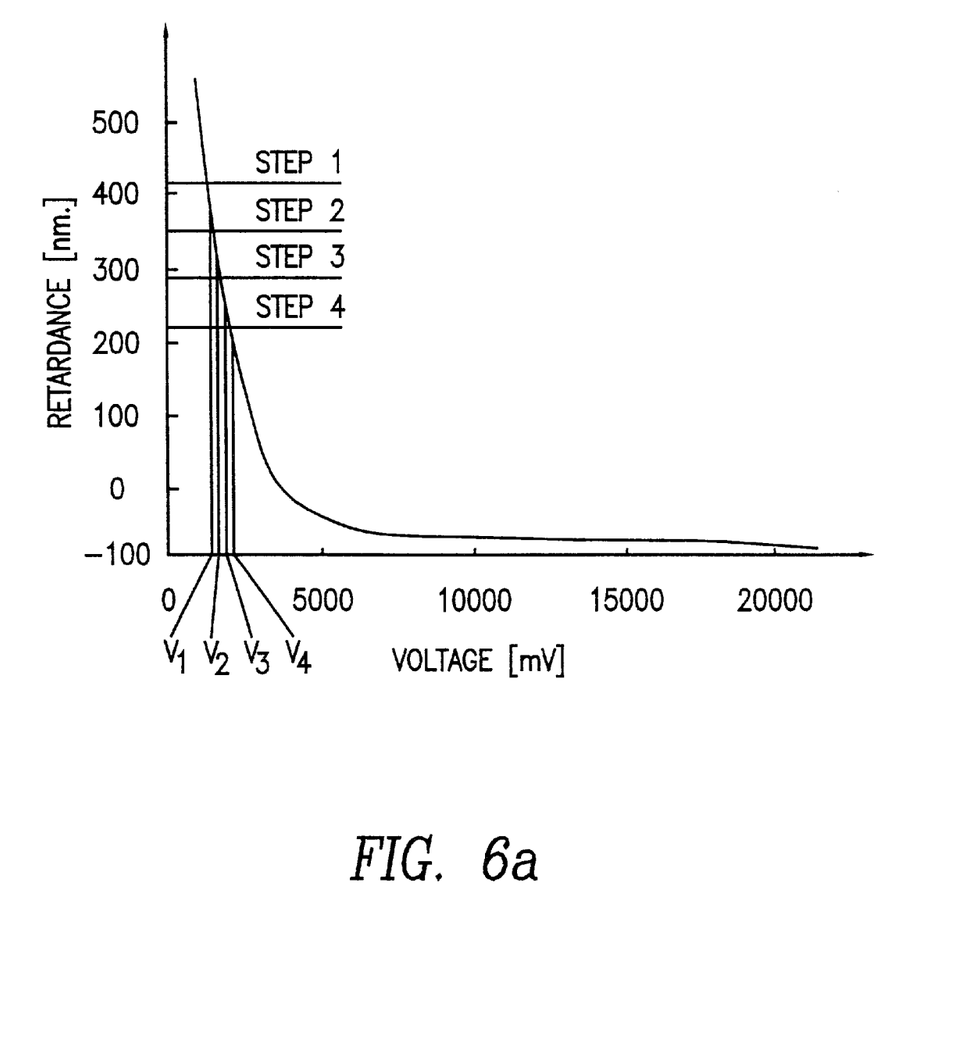
FIG. 6a is a graph of phase retardance versus voltage applied to the electrooptic variable phase retarder in the system of FIG. 4, when used to map skin topography.

It is necessary that at least three different phase shifts be provided by the variable phase retarder 42. Four are preferred in skin topography. Five or more may provide further resolution, which may be preferable in other applications. FIG. 6a is a graph of the relationship between phase retardation and voltage for the liquid crystal variable phase retarder 56 available from Meadowlark Optics, used in the system of FIG. 5 for mapping skin topography. The four voltages $V_1$, $V_2$, $V_3$, $V_4$ cause corresponding phase shifts indicated by Step 1, Step 2, Step 3 and Step 4, respectively, of $\pi/2$ radian increments. $V_1$, $V_2$, $V_3$ and $V_4$ correspond to voltages of 1.138, 1.336, 1.588 and 2.103 volts, respectively.

Figure 6B:
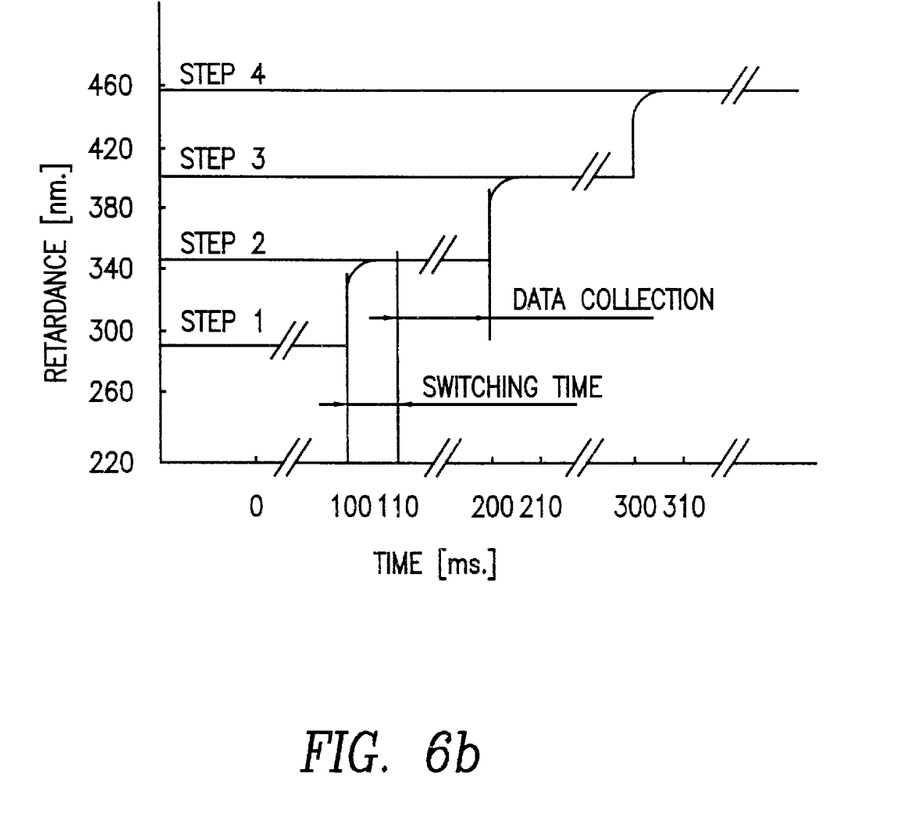

FIG. 6b is an example of a timing diagram showing the Steps 1–4 of FIG. 6a. The switching time between steps in this example is about 10 milliseconds but can be as fast as 1–2 milliseconds with the Meadowlark Optics liquid crystal. Switching time of faster than about 100 milliseconds is preferred in mapping skin topography of a live subject. Faster than about 20 milliseconds is more preferred. Data collection at each step takes approximately 90 milliseconds for the CCD camera 56 identified above. Total data collection time of less than about 500 milliseconds is preferred so that three to five images can be obtained before system drift introduces significant error into the imaging process. The images are also obtained fast enough so that in applications such as mapping skin topography of a live subject, movement of the subject, vibration by the operator or other external disturbances, would not interfere with measurements.

By suitable choice of the beam expander optics, the fringes can be projected over an area of as large as about 200 mm×200 mm, down to about 1 mm×1 mm. A region of 20 mm×20 mm is appropriate for analyzing the depth of wrinkles on skin. About 1 mm×1 mm to about 10 mm×10 mm is appropriate for analyzing the topography of nevi. The dimensions of the components would be varied based on the particular application and desired projection area.

Figure 7A:
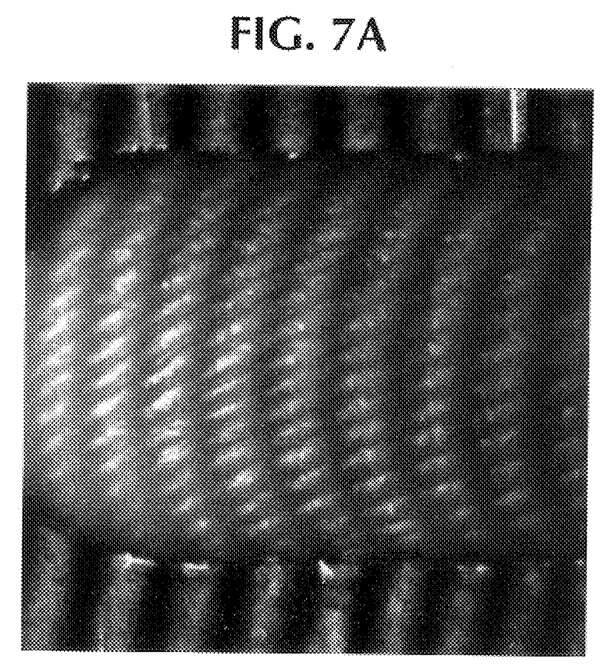
FIG. 7a is an image of the papillary ridges of the side of a forefinger, taken with a laboratory set up corresponding to FIG. 3.

FIG. 7a is an image of the papillary ridges of the side of a forefinger showing the projected fringes at one of four phase steps, as imaged with a laboratory set up corresponding to FIG. 3. The laser had a wavelength of 528 nanometers. The forefinger was supported by an appropriate fixture. A rectangular box with one open wall for receiving the finger and another open wall for allowing the passage of light, was used. The field of view was 10 mm×10 mm. The PBS 38 was a prism cube equipped with a pair of mirrors that enabled variable fringe spacing. The fringe spacing used to obtain these images was 1.3 lines per mm. The imaging time was 0.4 seconds. The phase retardation in each image is shifted by $\pi/2$ from the prior image. The vertically curved lines in the center of the image of FIG. 7a indicate the elevation profile of the finger. The vertical lines at the top and essentially vertical lines at the bottom of the image are the fringe projections on a wall of the box adjacent to the forefinger. The preferred speckle averaging technique discussed above was used in preparation of the image.

Figure 7B:
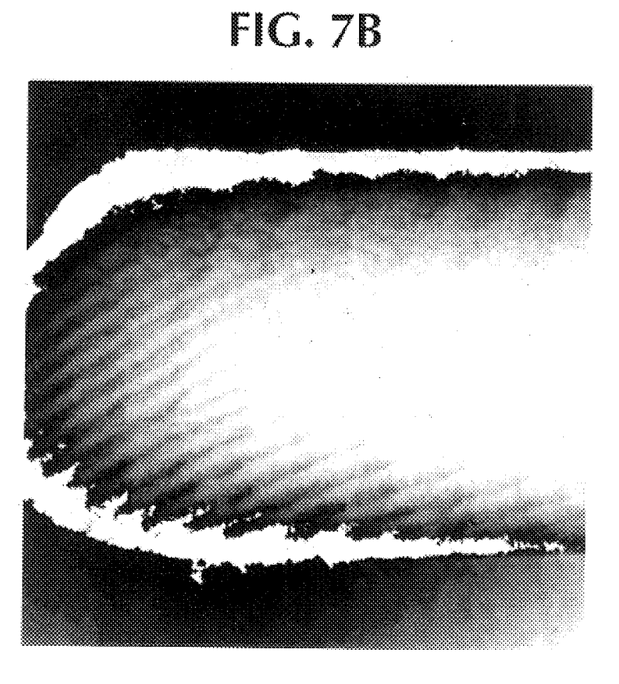

FIG. 7b is a grey-scale representation of the reconstructed elevation variations of the papillary ridges derived from the images of FIG. 7a and three similar images in which the fringes were displaced by one-quarter of their period between successive images. The height in FIG. 7b is indicated by the level of brightness of each pixel in the images. No attempt was made to restore the height differentials in the images associated with the $2\pi$ phase discontinuties that occur when the height changes by an amount corresponding to the fringe period. Other representations of the quantitative measure of the height variations across the ridges can be obtained by standard image processing techniques, such as 3-dimensional wire-mesh representations through Auto CAD(R).

Figure 8:
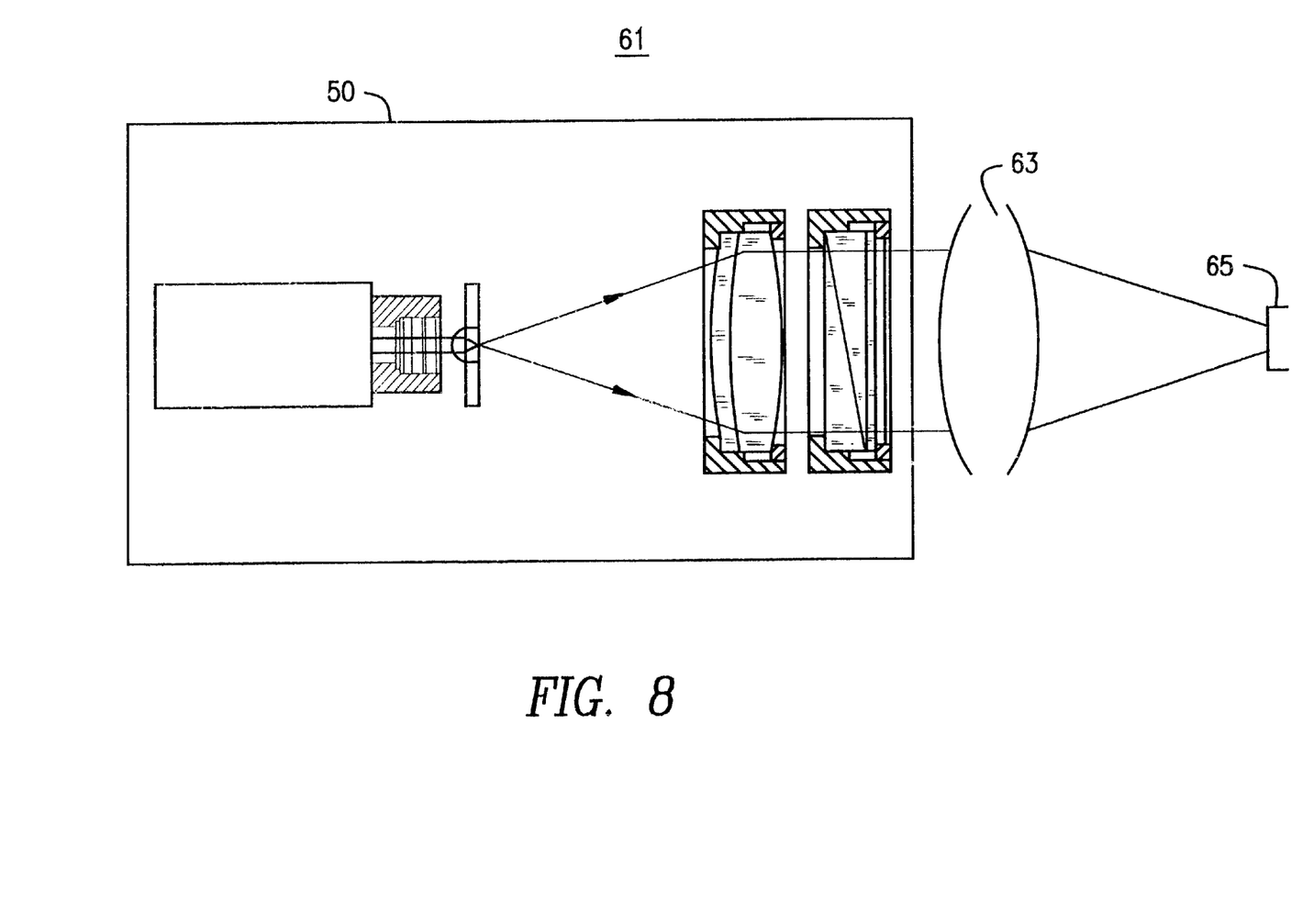
FIG. 8 is a schematic diagram of a system in accordance with the present invention incorporating the interferometer of FIG. 3, for use in optical testing.

FIG. 8 illustrates use of the interferometer 50 in a system 61 for testing optical elements. The fringe projection interferometer can be regarded as a differential interferometer. As such, it is compatible with the Ronchi test and thus can be used directly to test optical components. See, for example, Malacara, *Optical Shop Testing,* John Wiley & Sons, N.Y. 1978, Chapter 9. The two interfering beams output by the interferometer 50 are transmitted through the optical system 63 to be tested, which can be a lens, for example. The image of the fringes is then captured by the electronic CCD detector 65. Both interfering beams undergo lateral displacement as they travel from the tested system to the detector plane. The interference fringes are distorted in proportion to the first derivative along the displacement direction of the function describing the phase of the wavefront after it passes through the optical system 63. Distortions indicated by the interfering beams upon transmission through the optical system 63 could be measured. Reflection characteristics of a surface of the optical system 63 could also be measured by appropriate positioning of the interferometer 50 and CCD 65.

Figure 9:
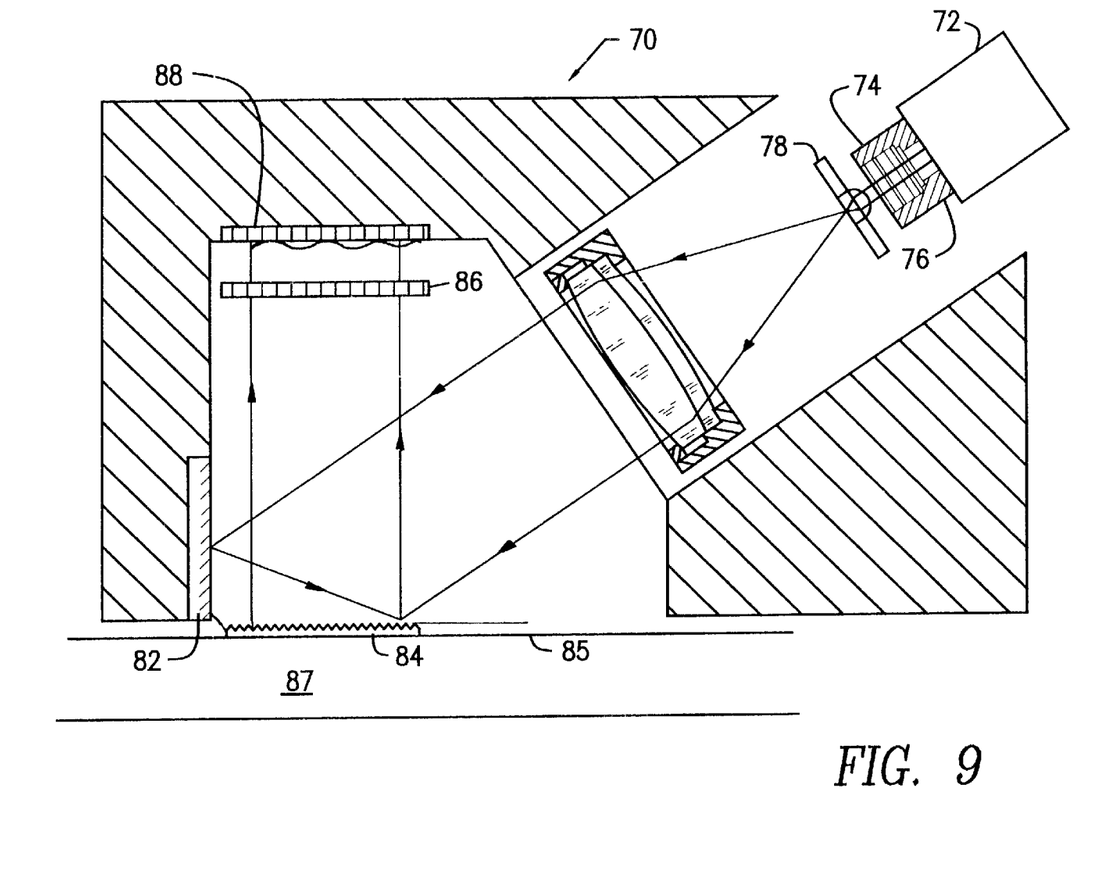
FIG. 9 is a schematic diagram of a system in accordance with the present invention for use in monitoring the position of mechanical devices.

In FIG. 9, the interferometer of the present invention is shown in a system 70 for measuring the lateral shift of mechanical objects. The system 70 includes a laser 72, a polarizer 74, a variable phase retarder 76, a beam expander 78 and collimating lenses 80, as above. A polarization beam splitter in a Lloyd's mirror arrangement 88 provides interference between light reflected from a mirror 82 and light projected directly from the laser 72. The reflected light and the direct light are projected at a high density phase diffraction grating 84, which is attached to the surface 85 of the mechanical object 87. The interfering light beams reflected from the diffraction grating 84 in a direction normal to the surface 85 pass through a polarizer 86 and are captured by a linear type CCD detector 88.

In this case, the Lloyd's mirror arrangement acts as the polarization sensitive beam splitter and allows proper illumination of the phase diffraction grating. The grating should be illuminated from opposite directions corresponding to the +1 and −1 diffraction orders. The two diffracted beams in the direction perpendicular to the grating surface (corresponding to the 0th diffraction order) form a system of straight interference fringes that can be observed in the detector plane. The density of these fringes can be adjusted to the desired value by slightly changing the illumination angle. By applying the phase-shift method it is expected that the position of the diffraction grating could be calculated with respect to the CCD detector 88 to an accuracy of better than d/100, where d is the grating period. An angle of illumination of about 60° for each of the two illuminating beams is preferred to achieve a fringe spacing of about 1 micrometer ($\mu$m). That is sufficient to detect shifts in the position of the object of as little as 10 nanometers. This system enables the highly accurate monitoring of the position of microscopes and tooling and lithographic machines, for example.

The sources cited above are incorporated by reference, herein. While the present invention has been described with respect to the presently preferred embodiments, it will be apparent to those skilled in the art that various changes and modifications may be made without departing from the spirit and scope of the invention, as defined by the claims below.

We claim:

1. An interferometric measurement system comprising:
   apparatus capable of being handheld including:
   a source of a linearly polarized light beam;
   a variable phase retarder positioned to receive the linearly polarized light beam, the variable phase retarder comprising a birefringent material for retarding the relative phase between orthogonal components of the linearly polarized light;
   a polarization beam splitter positioned to receive the light from the phase retarder, the beam splitter splitting the orthogonal components of the phase retarded light into two light beams inclined with respect to each other;
   a polarizer positioned to receive the two light beams and project an interference pattern resulting from the two light beams onto a surface; and
   a detector for detecting light reflected from or scattered by the surface including imaging means to derive fringe positions and surface height from distortions in the phase shifted fringe images derived from said interference pattern; and variable voltage supply means coupled to said variable phase retarder, operable for applying successive voltage signals in voltage steps of different amplitude thereto, for operating said variable phase retarder to change the phase between the orthogonal components in a stepwise manner.

2. The system of claim 1, wherein the variable phase retarder is an electrooptic device.

3. The system of claim 2, wherein the electrooptic device is a liquid crystal.

4. The system of claim 1, wherein the source comprises a light source and a linear polarizer positioned between the light source and the variable phase retarder.

5. The system of claim 1, further comprising a compact beam expander between the variable phase retarder and the beam splitter.

6. The system of claim 5, wherein the expander includes a ball lens.

7. The system of claim 1, wherein the beam splitter is a Wollaston prism.

8. The system of claim 1, wherein the light source has high transverse spatial coherence.

9. The system of claim 1, wherein the detector is a camera, the interferometer further comprising optics coupling light reflected or scattered from the surface to the camera.

10. The system of claim 9, wherein the camera is a video camera.

11. The system of claim 9, wherein the camera is a charge-coupled-device.

12. The system of claim 11, wherein said imaging means further includes an external digital processor coupled to the charge-coupled-device, the digital processor being programmed to derive said fringe positions and surface height from distortions in the phase shifted fringe images.

13. The system of claim 12, wherein the digital processor is coupled to the variable voltage supply means, and program for operating the latter to produce said voltage steps.

14. The system of claim 12, further comprising means for electronically summing the signals output from a plurality of neighboring pixels of the charge-coupled-device, prior to recording the data.

15. The system of claim 5, further comprising a collimating lens system between the beam expander and the beam splitter, wherein the distance between the receiving face of the collimating lens system and the focal point of the collimating lens system is less than the effective focal length of the collimating lens system.

16. The system of claim 15, wherein the f/numbers of the beam expander and the collimating lens system are not the same.

17. The system of claim 2, further comprising a control device coupled to the voltage supply.

18. The system of claim 17, wherein the voltage is controlled to cause the phase retardation in less than about 0.10 seconds.

19. A common path, two beam interferometric measurement system comprising:
   a hand-held apparatus including:
      a light source with high transverse spatial coherence;
      a first linear polarizer for linearly polarizing light output by the source;
      a voltage-controlled electrooptic liquid crystal variable phase retarder positioned to receive the linearly polarized light from the first polarizer for retarding the relative phase between the orthogonal components of the linearly polarized light in a stepwise fashion;
      a compact optical beam expander positioned to receive the orthogonally polarized phase retarded light from the variable phase retarder;
      a collimating lens system positioned to receive light from the beam expander;
      a polarization beam splitter positioned to receive the expanded light beam from the collimating lens system, the beam splitter splitting the orthogonally polarized phase retarded light beams into two light beams inclined with respect to each other;
      a second polarizer positioned to receive the two light beams from the polarization beam splitter, for projecting an interference pattern resulting from the two light beams onto a surface;
      a CCD camera; and
      coupling optics for coupling light reflected from or scattered by the surface to the CCD;
      wherein the light is conveyed without the use of fiber optics;
   a voltage source coupled to the liquid crystal; and
   an external digital processor coupled to an output of the CCD and to the voltage source, for analyzing signals output by the CCD and for controlling the voltage applied to the liquid crystal.

20. A common path, two beam interferometer comprising:
   apparatus capable of being handheld including:
      a source of a linearly polarized light beam;
      a variable phase retarder positioned to receive the linearly polarized light beam, the variable phase retarder comprising a birefringent material for retarding the relative phase between two orthogonal components of the linearly polarized beam;
      a compact beam expander;
      a beam-splitter located downstream of the beam expander, the beam splitter splitting two orthogonal components of the light beam received from the beam expander into two light beams inclined with respect to each other; and
      a polarizer positioned to receive the two light beams and project the interference pattern resulting from the two light beams onto a surface a variable voltage supply coupled to said variable phase retarder, said variable phase supply being operable for applying successive signals in voltage steps of different amplitude for changing the phase between the two orthogonal components in a stepwise manner; and control means for operating said variable voltage supply to produce said voltage steps.

21. A system comprising:
   apparatus capable of being handheld, including:
      means for linearly polarizing light received from a source;
      means responsive to said successively stepped voltage signals for birefringently phase retarding orthogonal components of the linearly polarized light relative to each other in a stepwise fashion;
      means for splitting the phase retarded light into two light beams inclined with respect to each other;
      means for projecting an interference pattern resulting from the split light beams onto a surface; and
      means for producing successively stepped voltage signals; and
      means for analyzing the light reflected and scattered from the surface.

22. A method of conducting interferometric analysis with apparatus capable of being handheld, said method comprising the steps of:

providing a linearly polarized beam of light;

producing voltage signals that are successively stepped in voltage level; applying said voltage signals to a birefringent phase retarder through which said linearly polarized beam of light is passed, for birefringently phase retarding the orthogonal components of the linearly polarized light beam relative to each other at least three times in a stepwise fashion;

splitting the phase retarded light from each phase retardation step into two interfering light beams inclined with respect to each other;

projecting the two interfering light beams from each step onto a surface; and analyzing the light reflected from or scattered by the surface including electronically imaging the reflected or scattered light from deriving fringe positions and surface height from distortions in the phase shifted fringes.

23. The method of claim 22, wherein the phase retarding step comprises voltage controlled electrooptical phase retardation.

24. The method of claim 22, further comprising expanding the light beam by passing the light through a ball lens, prior to the splitting step.

25. The method of claim 22, wherein the projecting step comprises projecting the interfering light beams onto the skin of a living subject for analyzing the topography of the skin.

26. The method of claim 25, wherein each phase shifting step is established in less than about 0.10 seconds.

27. The method of claim 26, wherein the providing step comprises providing light having a wavelength in the range of 450–550 nanometers and the splitting step comprises splitting the light such that the projected fringe spacing of the interfering light beams is between about 0.5–2 lines per mm.

28. The method of claim 27, wherein the analyzing step comprises electronically detecting the light with a plurality of detectors and electronically summing the signals output by a plurality of neighboring detectors.

29. The method of claim 22, wherein each phase shifting step is established in less than about 0.10 seconds.

* * * * *